(12) United States Patent
Flood

(10) Patent No.: US 9,229,858 B2
(45) Date of Patent: Jan. 5, 2016

(54) CONCURRENT GARBAGE COLLECTOR THREAD

(71) Applicant: Red Hat, Inc., Raleigh, NC (US)

(72) Inventor: Christine H. Flood, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 155 days.

(21) Appl. No.: 14/049,144

(22) Filed: Oct. 8, 2013

(65) Prior Publication Data

US 2015/0100752 A1    Apr. 9, 2015

(51) Int. Cl.
G06F 12/02    (2006.01)

(52) U.S. Cl.
CPC ...... *G06F 12/0269* (2013.01); *G06F 2212/702* (2013.01)

(58) Field of Classification Search
CPC .......................... G06F 12/0276; G06F 12/0269
USPC ........................................ 711/171, 170, 114
See application file for complete search history.

(56) References Cited

U.S. PATENT DOCUMENTS

| | | | |
|---|---|---|---|
| 4,989,134 A * | 1/1991 | Shaw | 711/135 |
| 5,692,185 A * | 11/1997 | Nilsen et al. | 707/814 |
| 6,249,793 B1 | 6/2001 | Printezis et al. | |
| 6,289,360 B1 | 9/2001 | Kolodner et al. | |
| 6,721,865 B2 | 4/2004 | Lewis | |
| 6,978,285 B2 | 12/2005 | Li | |
| 7,310,655 B2 | 12/2007 | Dussud | |
| 7,529,786 B2 | 5/2009 | Andreasson | |
| 7,533,228 B1 * | 5/2009 | Garthwaite | 711/159 |
| 8,127,280 B2 | 2/2012 | Thomas et al. | |
| 8,880,784 B2 * | 11/2014 | Chiueh et al. | 711/103 |
| 2005/0198088 A1 | 9/2005 | Subramoney | |
| 2012/0203994 A1 | 8/2012 | Burka et al. | |

OTHER PUBLICATIONS

Corporaal, Automatic Heap Management and Real Time Performance, CompEuro '91 Advanced Computer Technology Prov., 1991, pp. 290-295.*
Corporaal et al, The Design Space of Garbage Collection, CompEuro '91 Advanced Computer Technology Proc., 191, pp. 423-428 using incremental copying collectors, System Sciences, 1991 Annual Haugic International Conf. P.*
Ke Bai et al, "Automatic and Efficient Heap Data Management for Limited Local Memory Multicore Architectures", National Sience Foundations, 2013.*

(Continued)

*Primary Examiner* — Pierre-Michel Bataille
(74) *Attorney, Agent, or Firm* — Haynes and Boone, LLP

(57) ABSTRACT

An example method of managing memory for an application includes identifying a plurality of regions of a heap storing one or more objects of a first type and one or more objects of a second type. Each object of the second type stores a memory address of an object of the first type. The method also includes selecting a set of target collection regions of the heap. The method includes in a concurrent marking phase, marking one or more reachable objects of the first type as live data. The method further includes for each region of the plurality maintaining a calculation of live data in the respective region. The method also includes traversing the objects of the first type marked in the concurrent marking phase and evacuating a set of traversed objects from a target collection region to a destination region of the heap.

20 Claims, 10 Drawing Sheets

(56) References Cited

OTHER PUBLICATIONS

"Java SE 6 HotSpot [tm] Virtual Machine Garbage Collection Tuning;" Oracle Technology Network; pp. 1-15; http://www.oracle.com/technetwork/java/javase/gc-tuninq-6-140523.html.

Ori Ben-Yitzhak; Irit Goft; Elliot K. Kolodner; Kean Kuiper and Victor Leikehman; "An Algorithm for Parallel Incremental Compaction"; ISMM '02, Jun. 20-21, 2002, Berlin, Germany, IBM Haifa Research Laboratory Mount Carmel Haifa 31905; Israel; pp. 100-105.

Diab Abuaiadh; Yoav Ossia; Erez Petrank and Uri Silbershtein; "An Efficient Parallel Heap Compaction Algorithm;" OOPSLA '04, Oct. 24-28, 2004, Vancouver, British Columbia, Canada, IBM Haifa Research Laboratory Mount Carmel Haifa 31905; Israel; pp. 224-236.

Haim Kermany and Erez Petrank; "The Compressor: Concurrent, Incremental, and Parallel Compaction;" Department of Computer Science; Technion, PLDI, '06, Jun. 10-16, 2006, Ottawa, Ontario, Canada, Israel Institute of Technology; Haifa 32000; Israel; pp. 354-363.

* cited by examiner

CONCURRENT GARBAGE COLLECTOR THREAD

FIELD OF DISCLOSURE

The present disclosure generally relates to memory management, and more particularly to garbage collection.

BACKGROUND

In the field of computer systems, a program may allocate memory for objects from a free memory area called a heap. Memory is allocated to, and freed from, the heap. Eventually, when the objects are no longer being referenced by the program, the memory allocated for the created objects is reclaimed through a garbage collection process. Garbage collection may refer to a process of identifying unused areas of main memory storage. The garbage collection process clears the objects from memory, and the once allocated memory is again available for use.

Modern programs may dynamically generate objects that are stored on the heap. Although different uses of the term may exist, the discussion that follows will use heap to refer to shared memory managed by automatic garbage collection. The garbage collector has control of and/or direct access and/or knowledge of the addresses, classes, roots, and other such detailed information about all live objects created in the system. After an object is no longer needed, it is desirable to reclaim the memory allocated to the object to prevent the system from running out of memory as more temporary objects fill the heap. Garbage collectors operate by reclaiming space that is no longer "reachable."

In some systems, which are usually known as "object oriented," objects may have associated methods that are routines that can be invoked by reference to the object. An object may belong to a class, which is an organizational entity that may contain method code or other information shared by all objects belonging to that class. In the discussion that follows, though, the term object will not be limited to such structures; it will additionally include structures with which methods and classes are not associated.

BRIEF SUMMARY

This disclosure relates to memory management. Methods, systems, and techniques for managing memory are disclosed.

According to an embodiment, a system for managing memory includes a region identifier that identifies a plurality of regions of a heap storing one or more objects of a first type and one or more objects of a second type and selects a set of target collection regions of the heap. During a concurrent marking phase, for each region of the plurality the region identifier maintains a calculation of live data in the respective region. Space from the heap is allocated for an application. Each object of the second type stores a memory address of an object of the first type, and the plurality of regions includes one or more target collection regions and one or more destination regions. The system also includes a marking module that in a concurrent marking phase marks one or more reachable objects of the first type as live data. The one or more reachable objects marked in the concurrent marking phase is stored on the heap. The system further includes an evacuator that traverses the objects of the first type marked in the concurrent marking phase and evacuates a set of traversed objects from one or more target collection regions of the set of target collection regions to a destination region of the heap.

According to another embodiment, a method of managing memory includes identifying a plurality of regions of a heap storing one or more objects of a first type and one or more objects of a second type. Each object of the second type stores a memory address of an object of the first type, and the plurality of regions includes one or more target collection regions and one or more destination regions. The method also includes selecting a set of target collection regions of the heap. Space from the heap is allocated for an application. The method further includes during a period of time in which the application is executing on a computing device, in a concurrent marking phase, marking one or more reachable objects of the first type as live data and for each region of the plurality, maintaining a calculation of live data in the respective region. The one or more reachable objects marked in the concurrent marking phase is stored on the heap. The method also includes during the period of time in which the application is executing on a computing device, traversing the objects of the first type marked in the concurrent marking phase and evacuating a set of traversed objects from one or more target collection regions of the set of target collection regions to a destination region of the heap.

According to another embodiment, a non-transitory machine-readable medium including a plurality of machine-readable instructions that when executed by one or more processors is adapted to cause the one or more processors to perform a method including: identifying a plurality of regions of a heap storing one or more objects of a first type and one or more objects of a second type, each object of the second type storing a memory address of an object of the first type, and the plurality of regions including one or more target collection regions and one or more destination regions; selecting a set of target collection regions of the heap, wherein space from the heap is allocated for an application; and during a first period of time in which the application is executing on a computing device: in a concurrent marking phase, marking one or more reachable objects of the first type as live data, the one or more reachable objects marked in the concurrent marking phase being stored on the heap; for each region of the plurality, maintaining a calculation of live data in the respective region; traversing the objects of the first type marked in the concurrent marking phase; and evacuating a set of traversed objects from one or more target collection regions of the set of target collection regions to a destination region of the heap.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
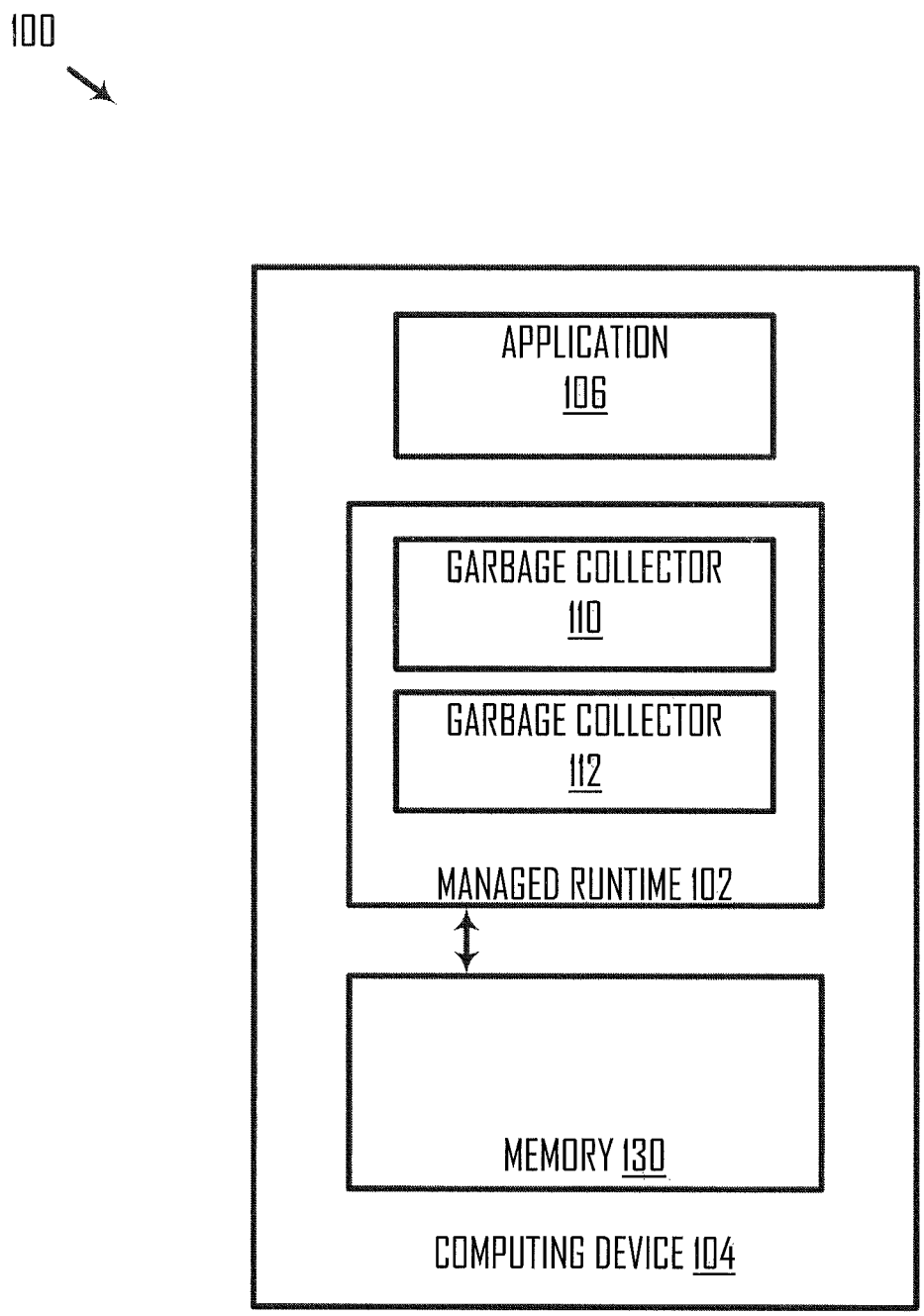
FIG. 1 is a simplified block diagram illustrating a system for managing memory, according to an embodiment.

I. Overview
II. Example System Architecture
   A. Allocated Objects Stored on the Heap
      1. Header Fields and Application-Specific Data in Shared Object
      2. Reference Object References Shared Object
   B. Reference Object and Shared Object are Separate Objects
III. Garbage Collection Cycles
   A. Initial Garbage Collection Cycle
      1. Mark Root Set
      2. Initial Concurrent Marking Phase
      3. Enforce Read and Write Barriers to Maintain Consistency
      4. Process Updates that Occurred During Initial Concurrent Marking Phase
   B. Subsequent Garbage Collection Cycles
      1. Select Target Collection Regions
      2. Shared Objects Referenced by Root
      3. Subsequent Concurrent Marking Phase
      4. Evacuate Traversed Objects Located in Target Collection Regions and Update References
IV. Example Method
V. Example Computing System I. Overview It is to be understood that the following disclosure provides many different embodiments, or examples, for implementing different features of the present disclosure. Some embodiments may be practiced without some or all of these specific details. Specific examples of modules and arrangements are described below to simplify the present disclosure. These are, of course, merely examples and are not intended to be limiting.

Many software applications, rely on a managed runtime, a software component that provides services to manage an application's use of specific hardware resources. Common benefits of employing a managed runtime may be that the task of the application developer is simplified, portability to different hardware is provided, and the available resources (e.g., memory) are better used. Managed runtimes may implement one or more garbage collectors, allowing an application to be run with the one whose cost-benefit trade-off best suits the needs of the application. Different garbage collectors with widely varying costs and benefits exist. The present disclosure may be used in relation to a managed runtime that supports the use of multiple, alternative garbage collectors. This is not intended to be limiting, and it should be understood that the present disclosure may also be used in relation to a managed runtime that supports the use of a single garbage collector that can benefit from and use the techniques presently disclosed.

A managed runtime may be a virtual machine. An example of a managed runtime is a JAVA® virtual machine (JVM) such as OPENJDK®. Trademarks are the property of their respective owners. OPENJDK® JVM supports the use of multiple, alternative garbage collectors. The standard unit of allocation for a garbage collector is a single application data record and may be referred to as an object. The garbage collector may record management information that helps the garbage collector manage the objects in use and also manage the memory that is available for allocation.

The term mutator may be used to distinguish the part of the program that does "useful" work from that which does the garbage collection. It may be desirable to allow garbage collector threads and mutator threads to run concurrently. This is in contrast to other garbage collection approaches that rely on stopping the mutator threads while performing garbage collection. This "stop-the-world" scenario allows the garbage collector to evacuate objects from a target collection region of the heap to a destination region of the heap, and then update the mutator threads so that they point to the relocated objects in the destination region. During the "stop-the-world" phase, the mutator threads are halted.

During garbage collection, live objects from one or more target collection regions are compacted into a destination region and then the target collection regions are available for reuse. Allowing garbage collector threads and mutator threads to run concurrently may eliminate or greatly reduce user observable garbage collector pause times. A garbage collector thread and mutator thread run concurrently when execution of a garbage collector process and an application process has some overlap. The garbage collector and mutator threads may run concurrently on a single or multiple central processing units (CPUs). In an example, a garbage collector thread may run on a first processor during a period of time in which a mutator thread is running on a second processor. In another example, a garbage collector thread may start running on a processor and stop before completion, a mutator thread may start running on the processor and stop before completion, and the garbage collector thread may resume running on the processor and finish. In another example, a mutator thread may start running on a processor and stop before completion, a garbage collector thread may start running on the processor and stop before completion, and the mutator thread may resume running on the processor and finish.

While garbage collector threads are running concurrently with mutator threads, however, a mutator thread may attempt to read an object that the garbage collector thread is about to evacuate or has already evacuated from the target collection region to the destination region of the heap. If the garbage collector thread has already evacuated the object to the destination region, the mutator thread may read the wrong object in the target collection region if the mutator thread has not yet been informed of the object's updated location.

Further, while garbage collector threads are running concurrently with mutator threads, a mutator thread may attempt to update an object that a garbage collector thread is about to evacuate or has already evacuated from the target collection region to a destination region of the heap. If the garbage collector thread has already evacuated the object to the destination region, the mutator thread's update to the object may be lost if the update was made to the object located in the target collection region. In another example, a first mutator thread may attempt to update an object that a second mutator thread is about to update and evacuate or has already evacuated from the target collection region to a destination region of the heap. If the second mutator thread has already evacuated the object to the destination region, the first mutator thread's update to the object located in the target collection region may be lost.

The present disclosure provides techniques to manage the compaction of the live objects concurrently with the mutator threads that may be reading and/or writing these same objects, while avoiding the disadvantages noted above.

II. Example System Architecture

FIG. 1 is a simplified block diagram 100 illustrating a system for managing memory, according to an embodiment.

Diagram 100 includes a managed runtime 102 that executes on a computing device 104. Computing device 104 may be a workstation, computer, server, game console, set-top box, kiosk, embedded system, mobile device (e.g., a mobile phone, personal digital assistant, tablet, and laptop), or other device having at least one processor and memory. Computing device 104 may have multiple processors that share a portion of memory.

Managed runtime 102 may be a software program that communicates with an application 106 executing on computing device 104. Managed runtime 102 may include a garbage collector 110, 112 that is responsible for managing the memory resources of the hardware. A garbage collector may allocate areas of memory 130 to application 106 on demand, and when the memory area is no longer in use by the program, reclaim the memory area for reuse. Memory 130 may include a free memory area called a heap, and application 106 may dynamically generate objects that are stored on the heap.

Garbage collectors 110 and 112 may be present in the delivered program binary. In an example, only one of garbage collectors 110 and 112 is selected to operate in any given program run. In another example, a plurality of garbage collectors (e.g., garbage collectors 110 and 112) are selected to operate in any given program run. The plurality of garbage collectors may execute concurrently during a single program run, each managing objects allocated from its own subset of the heap. In an example, different garbage collectors may be used to provide more or less timely allocation for different categories of applications if managed runtime 102 were used to support deployment of a suite of applications.

A. Allocated Objects Stored on the Heap

Figure 2:
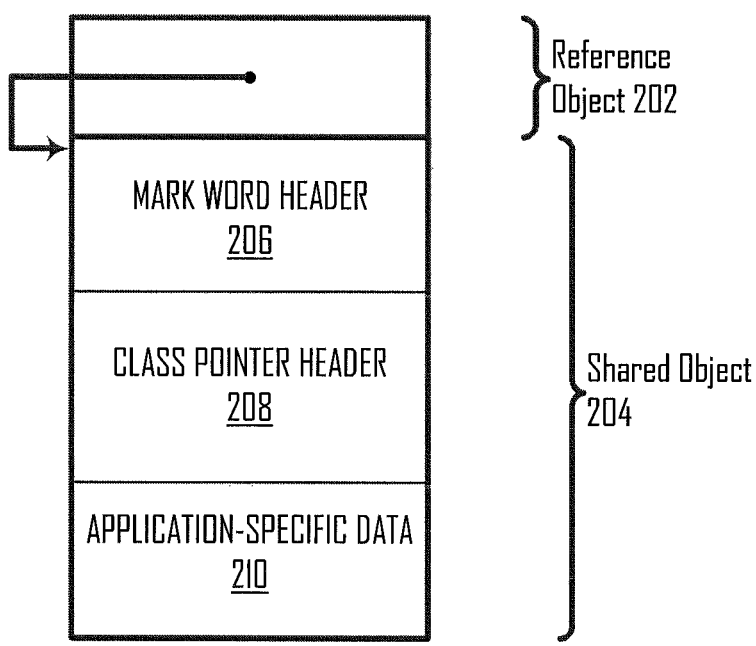
FIG. 2 is a diagram illustrating a reference object and a shared object, according to an embodiment.

FIG. 2 is a diagram 200 illustrating a reference object 202 and a shared object 204, according to an embodiment. Memory may be allocated from the heap for reference object 202 and shared object 204. Shared object 204 includes a set of headers (e.g., mark word header 206 and class pointer header 208) and application-specific data 210. Although two headers are illustrated, other embodiments having more or fewer than two headers are within the scope of this disclosure. Further, it should be understood that a header may store management data different from that described in the disclosure.

1. Header Fields and Application-Specific Data in Shared Object

A header may be included in all allocated objects and may be unused by the application for which the object is allocated. Rather, the header may be used by the managed runtime to manage the application-specific data to ensure proper and consistent execution of the application (e.g., the application can manipulate fields within shared object 204). It may be beneficial to store the set of headers at the front of shared object 204 so that application-specific data 210 starts at the same location in each shared object. As such, application-specific data 210 in shared object 204 are located at a fixed offset from the start of the shared object. Two shared objects allocated for the same application or different applications may include the same set of header fields but different application-specific data.

In FIG. 2, mark word header 206 and class pointer header 208 are management data that may be used by managed runtime 102 to manage application-specific data 210. Mark word header 206 may be used by garbage collector 110 when it is scanning memory for unused objects to mark objects that have been visited. Mark word header 206 may include a mark/lock word that enables a thread to mark shared object 204 as live and/or information about locking shared object 204 so that another thread is unable to write to shared object 204. Mark word header 206 may also include a unique identifier that identifies shared object 204. The unique identifier may be implemented as, for example, a hashtag.

Class pointer 208 may include the address of a class record describing shared object 204 and, amongst other things, may identify the size of the shared object. In an example, class pointer header 208 includes a class pointer that specifies the object type of shared object 204. Each object (e.g., reference object 202 and shared object 204) in a program is an object of a specific type defined by a program (e.g., the application or virtual machine) Managed runtime 102 may determine based on the object's type what operations may be performed on the object, how to perform operations on the object, and what information is stored in the object.

Application-specific data 210 may refer to data that is defined by and used by application 106. Application-specific data 210 is specific to application 106 for which shared object 204 is allocated. Shared object 204's state may be described as its fields and properties. In an example, application-specific data 210 may include one or more fields. A field may be, for example, a count, a number that represents a cost, or a pointer that identifies text that specifies a person's name in application 106.

2. Reference Object References Shared Object

Object 202 may reference object 204 and be co-located with object 204 on a region of the heap. In an embodiment, reference object 202 may be located at a memory address adjacent to and preceding shared object 204. For example, reference object 202 may be a word that precedes shared object 204 and includes the garbage collector-specific data (e.g., forwarding-pointer field). The reference may be represented as a pointer to object 204 or as a memory address of object 204. In an example, reference object 202 may be an object handle that references shared object 204. Although reference object 202 is described as storing a memory address of shared object 204, it should also be understood that the reference object may store a pointer to the shared object.

B. Reference Object and Shared Object are Separate Objects

Reference object 202 is separate from shared object 204. A benefit of having reference object 202 separate from shared object 204 may be that the format of the shared object is unchanged and is compatible with other garbage collectors, third-party debugging and performance monitoring tools, and object serialization while still allowing a read and write barrier that ensures data consistency while the garbage collector and mutator threads are concurrently running. Thus, it may be unnecessary to change the application code or the runtime code.

Further, the separate reference objects support a multi-threaded environment and enable one or more threads to read or update the shared objects while they are being marked and/or evacuated from a target collection region to a destination region of the heap. For example, by having a reference object that references a shared object, a thread (e.g., garbage collector or mutator thread) can evacuate the shared object. As long as threads that want to access the shared object go through the corresponding reference object, these threads are able to access the most up-to-date version of the shared object.

III. Garbage Collection Cycles

FIGS. 3A-3F are diagrams illustrating objects stored in one or more regions of the heap being evacuated from a target collection region to a destination region of the heap, according to an embodiment. Although FIGS. 3A-3F illustrate two target collection regions and one destination region, this is merely an example. For example, in other embodiments, fewer than or more than two target collection regions may be selected. Further, other embodiments in which more than one destination regions are used to store evacuated objects are within the scope of the disclosure.

A thread may identify a plurality of regions of the heap storing one or more objects of a first type and one or more objects of a second type. Each object of the second type may store a memory address of an object of the first type, and the plurality of regions may include one or more target collection regions, one or more destination regions, and one or more regions that is neither a target collection region nor a destination region. In an example, an object of the first type is a shared object, and an object of the second type is a reference object.

Figure 3A:
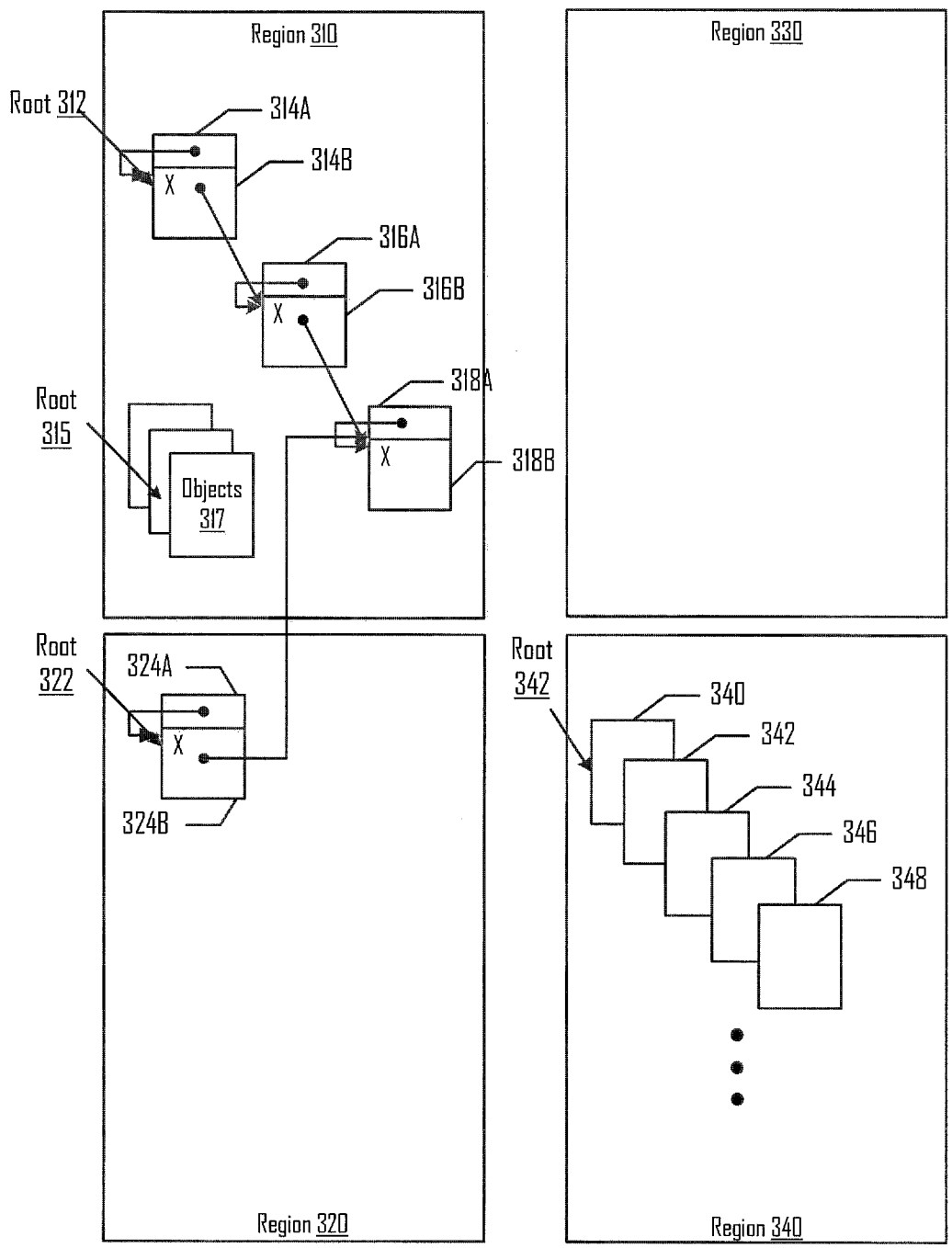
FIGS. 3A-3F are diagrams illustrating objects stored in one or more regions of the heap being evacuated from a target collection region to a destination region of the heap, according to an embodiment.

The heap is divided into regions that can each be collected independently. FIG. 3A is a diagram illustrating regions 310, 320, 330, and 340 of the heap, according to an embodiment. In FIG. 3A, reference objects 314A, 316A, and 318A and shared objects 314B, 316B, and 318B are stored in region 310 of the heap. In an example, reference object 314A stores a current memory address of 314B, reference object 316A stores a current memory address of 316B, and reference object 318A stores a current memory address of 318B. Additionally, a reference object 324A and a shared object 324B are stored in region 320 of the heap. In an example, reference object 324A stores a current memory address of 324B. Additionally, objects 317 are stored in region 310 and objects 340-348 are stored in region 340 of the heap.

A garbage collector may determine when to perform garbage collection. In an example, the garbage collector may determine, based on a predetermined threshold, to perform garbage collection and reclaim memory as free space. In such an example, the garbage collector may keep track of the number of allocated objects in memory and once the number exceeds a predetermined threshold number, the garbage collector initiates garbage collection. For example, when a predetermined portion of the heap (e.g., ⅔ of the heap) is allocated, the garbage collector may initiate garbage collection.

While application 106 is executing on computing device 104, space from the heap may be allocated for application 106. The garbage collector has control of and/or direct access and/or knowledge of the addresses, classes, roots, and other such detailed information about all live objects created in the system. When the garbage collector determines to initiate garbage collection, the garbage collector may perform actions to reclaim regions of the heap as free memory. Regions storing objects that are no longer "reachable" will eventually be reclaimed and available for allocation to new objects. An object may be considered reachable if it is referred to directly or indirectly by a reference in a root, referred to in an execution thread's call stack, or referred to by a reachable object. Additionally, a statically allocated object represented by a program's global variable is normally considered reachable throughout a program's life. Such an object may contain references to a dynamically allocated object that is reachable. Although the disclosure may describe a garbage collector thread as doing an amount of work, it should also be understood that one or more garbage collector threads may perform the amount of work.

A. Initial Garbage Collection Cycle

1. Mark Root Set

Garbage collector 110 may pause or resume execution of application 106 on computing device 104. In an embodiment, when the garbage collector determines to initiate garbage collection, the garbage collector may pause application 106 executing on computing device 104 and take a "snapshot at the beginning" (SATB), which entails all objects live at the start of the collection and all objects allocated during the collection being considered live. In an example, during a time period in which application 106 is paused on computing device 104, garbage collector 110 marks a root set. The root set may include reference values stored in the mutator threads' call stacks, the central processing unit (CPU) registers, and global variables outside of the garbage-collected heap.

In FIG. 3A, the garbage collector threads may mark roots 312, 315, 322, and 342. Root 312 has a reference to shared object 314B, root 315 has a reference to shared object 317, root 322 has a reference to shared object 324B, and root 342 has a reference to shared object 340.

2. Initial Concurrent Marking Phase

After the root set is marked, garbage collector 110 may resume execution of application 106 on computing device 104. In an example, during a time period in which the garbage collector and mutator threads are running concurrently, garbage collector 110 performs an initial concurrent marking phase and maintains for each region, a calculation of the live data.

During the initial concurrent marking phase, garbage collector threads may mark as live data one or more reachable shared objects stored on the heap. In an example, a garbage collector thread marks a shared object by changing one or more bits in its mark word header 206. "Live" data is reachable data that is still being used by the application. An object may be considered "reachable" if it is referred to by a reference in a root or if it is referred to by another reachable object. Further, for each region of the plurality of regions of the heap, garbage collector 110 may maintain a calculation of live data in the respective region. The calculations are used to determine the most profitable regions from which to collect at a later point in time. The determined profitable regions may be selected as the target collection region set.

The garbage collector threads may identify reachable objects to mark by starting with a marked root and traversing objects referenced by the root, traversing objects referenced by those reachable objects, and so on until all the referenced objects are found and are retained. The last object found has no references to other untraversed objects. An object graph may be identified by recursively traversing a chain of references starting from a root. For example, in FIG. 3A, an object graph may include root 312, shared object 314B (referred to in a reference in root 312), shared object 316B (referred to in a reference in reachable shared object 314B), and shared object 318B (referred to in a reference in reachable shared object 316B), and another object graph may include root 322 and shared object 324B (referred to in a reference in root 322).

3. Enforce Read and Write Barriers to Maintain Consistency

If a marked object is stored in a selected target collection region, the marked object will eventually be evacuated from the target collection region to a destination region of the heap. While the mutator and garbage collector threads are running, a garbage collector thread may mark an object that the mutator thread wants to read. The mutator thread may read the wrong object if the shared object has already been evacuated by the garbage collector. A read barrier may be enforced to ensure that the mutator thread reads from the memory address of the most up-to-date version of the shared object. In an example, to ensure that the mutator thread reads the most up-to-date version of the shared object, before reading shared object 204 the mutator thread identifies reference object 202, which includes the reference to shared object 204, to determine the current memory address of shared object 204. The thread may then use the read memory address to read shared object 204. Accordingly, the thread will read the most up-todate version of the shared object, whether or not the shared object has been evacuated to the destination region of the heap. A read barrier is described in prior U.S. patent application Ser. No. 14/018,279 to Flood et al., filed Sep. 4, 2013, entitled "Non-Intrusive Storage of Garbage Collector-Specific Management Data," which is incorporated herein by reference in its entirely.

Additionally, while the mutator and garbage collector threads are running, a garbage collector thread may mark an object that the mutator thread wants to update the target collection region. The update may be lost if the garbage collector has already evacuated the object from the target collection region to the destination region of the heap. A write barrier may be enforced to ensure that the mutator thread updates the most up-to-date version of the shared object and that no updates are lost. In an example, to ensure that no updates to shared objects are lost, when a mutator thread wants to update shared object 204 located in the target collection region, the mutator thread evacuates the shared object from the target collection region to a destination region (e.g., copies the shared object from the target collection region to the destination region and updates a reference object storing a current memory address of the shared object to store the memory address of the copy located in the destination region). In such an example, rather than update the shared object in the target collection region, the mutator thread updates the copy of the shared object located in the destination region. Thus, all writes occur to the same shared object and no updates are lost. A write barrier is described in prior U.S. patent application Ser. No. 14/029,544 to Flood et al., filed Sep. 17, 2013, entitled "Pauseless Garbage Collector Write Barrier," which is incorporated herein by reference in its entirely.

4. Process Updates that Occurred During the Initial Concurrent Marking Phase

The initial concurrent marking phase may end when the garbage collector threads have recursively traversed all of the reachable objects referenced by the marked root set. While the garbage collector threads are marking the shared objects during the initial concurrent marking phase, the mutator threads may update the shared objects (e.g., changing a reference in a shared object to point to a different shared object). Accordingly, objects that should have been marked may not be marked at the end of the initial concurrent marking phase.

In an example, the SATB has shared object "X" including a reference to shared object "Y," and during the initial concurrent marking phase, a mutator thread updates "X" so that it no longer includes the reference to "Y" and creates a new shared object "Z," which is marked, and updates a reference in "Z" to reference "Y." Accordingly, "Y," which should be marked, may not be marked. To avoid this problem and ensure that marked objects at the end of the initial concurrent marking phase are up to date, the write barrier may keep track of marked objects that are updated so that no updated objects or those that they reference are overlooked. Thus, in the above example, when the mutator thread updates a value in "X" (e.g., overwrites the reference that used to refer to "Y" to now refer to somewhere else), the old value (e.g., "Y") is stored in a queue (or other data structure) to acknowledge that "Y" was alive at the SATB. Any updates to shared objects and those that they reference that are made by mutator threads are put in a queue for the garbage collector to process. The garbage collector threads may process the objects in the queue to ensure that those objects that should be marked are marked.

To ensure complete and correct object graphs at a point in time, after the garbage collector finishes marking the live objects referenced by the root set during the initial concurrent marking phase, at some later point in time garbage collector 110 may pause application 106 to determine new object graphs that reflect the changes made by the mutator threads during the initial concurrent marking. The garbage collector may pause application 106 to process the remaining shared objects on the queue to reflect the updates made during the initial concurrent marking phase.

In an example, a garbage collector thread identifies updates to shared objects (e.g., marked objects) that occurred during the initial concurrent marking phase and marks one or more shared objects based on the identified updates. Thus, in keeping with the example above, the garbage collector thread may scan "Y," the "old content," which was placed in the queue by the mutator thread. The garbage collector may then mark "Y" as live. In another example, if a new shared object is allocated during the initial concurrent marking phase, the new shared object is placed in the queue and the garbage collector thread will mark that newly allocated shared object. In FIG. 3A, shared objects 314B, 316B, 318B, and 324B may be marked as live, as indicated by the mark "X". The rest of the shared objects may be determined to be not reachable, and the memory space used by these objects is eventually reclaimed by the garbage collector to be allocated for other objects.

After the garbage collector thread has processed the queue of updates, the object graphs are updated and complete as to the point in time when the SATB occurred and any newly created objects and updates to the shared objects since the SATB. Accordingly, the appropriate objects are marked as live and the garbage collector may traverse the marked objects and evacuate traversed objects located in a target collection region to a destination region of the heap.

B. Subsequent Garbage Collection Cycles

1. Select Target Collection Regions

As discussed, for each region of the plurality, the garbage collector maintains a calculation of live data in the respective region. Each region has an associated count of space that is freed if the region is collected, and the regions with the most reclaimable space may be selected to be part of the target collection region set. In an embodiment, during a period of time in which application 106 is paused on computing device 104, a garbage collector thread selects a set of target collection regions of the heap. The live objects stored in the target collection regions are eventually compacted into a destination region, and then the target collection regions are available for reuse and allocated for other objects.

In an example, the garbage collector calculates an amount of live data in each region of the heap and selects, based on the calculated live data in each region, the set of target collection regions of the heap. The garbage collector may select a region having a smaller amount of live data than another region of the heap to be in the target collection region set. In this way, the most profitable regions may be selected and reclaimed during the next garbage collection cycle. In an example, the garbage collector may select regions 310 and 320 in FIG. 3A as the set of target collection regions of the heap. In such an example, the garbage collector may determine that each of regions 310 and 320 has a smaller amount of live data (e.g., region with the smallest amount of live data) than another region of the heap. In an example, after the initial concurrent marking phase is complete, the garbage collector may quickly scan each region and calculate the amount of live data for each region.

2. Shared Objects Referenced by Root

During the period of time in which application 106 is paused on computing device 104, the garbage collector thread may also scan the root set, evacuate shared objects that are directly referenced by a root of the root set, and update the references in the roots to the evacuated objects. Each root of the root set references a shared object. The root set may include one or more reference values stored in mutator threads' call stacks, central processing unit registers, and global variables outside of the heap.

Scanning roots may include determining references in the roots to further objects. For example, in FIG. 3A, the root set may include roots 312, 315, 322, and 342, and scanning this root set may include determining a reference in root 312 that references shared object 314B, determining a reference in root 315 that references object 317, determining a reference in root 322 that references shared object 324B, and determining a reference in root 312 that references object 340.

In an embodiment, for each root of the root set that references an object in a target collection region, a garbage collector thread may evacuate from the target collection region to a destination region of the heap the shared object that is directly referenced by the respective root and update the respective root to reference the evacuated object stored in the destination region. A shared object may be directly referenced by a root if the reference stored in the root directly points to the shared object. A shared object may be indirectly referenced by a root if the reference stored in the root does not directly point to the shared object but another object along the chain of references from the root directly points to the shared object.

The shared object that is referenced by a root may be traversed. Evacuating a traversed object from a target collection region to a destination region of the heap may include storing a copy of the traversed object in a destination memory address located in the destination region of the heap, identifying a reference object storing a current memory address of the traversed object, and updating the current memory address stored in the reference object with the destination memory address. The garbage collector thread may identify the reference object by computing, based on a last-known memory address of the shared object, a memory address of the reference object. The garbage collector thread may read the current memory address stored in the reference object and locate the traversed object at the read memory address.

The garbage collector thread may determine whether the current memory address of the traversed object is located in a target collection region of the heap. When the current memory address of the traversed object is determined to be located in the target collection region of the heap, the traversed object has not yet been evacuated from the target collection region yet (e.g., by another thread) and the garbage collector thread may update the current memory address stored in the reference object with the memory address of the garbage collector thread's copy stored in the destination region.

When the current memory address is determined to not be located in the target collection region of the heap, another thread may have already evacuated the traversed object to a destination region of the heap and the garbage collector thread does not need to update the reference object to point to the garbage collector thread's copy stored in the destination region. Rather, because the garbage collector thread wanted to evacuate the traversed object to a destination region of the heap and another thread has accomplished the garbage collector thread's goal, the garbage collector thread may carry on doing other work. The garbage collector threads may continue to traverse the marked shared objects and evacuate a set of traversed shared objects from a target collection region of the selected set of target collection regions to a destination region of the heap.

To determine whether the current memory address of the traversed object is located in a target collection region of the heap, the garbage collector thread may identify an initial memory address of the traversed object located in the target collection region of the heap and determine whether the initial memory address matches the current memory address of the traversed object. When the initial memory address is determined to match the current memory address of the evacuated object, the garbage collector thread may update the current memory address stored in the reference object with the memory address of the garbage collector thread's copy of the traversed object stored in the destination region. When the initial memory address is determined to not match the current memory address of the evacuated object, the garbage collector thread may determine that the traversed object has already been evacuated to the destination region of the heap.

Figure 3B:
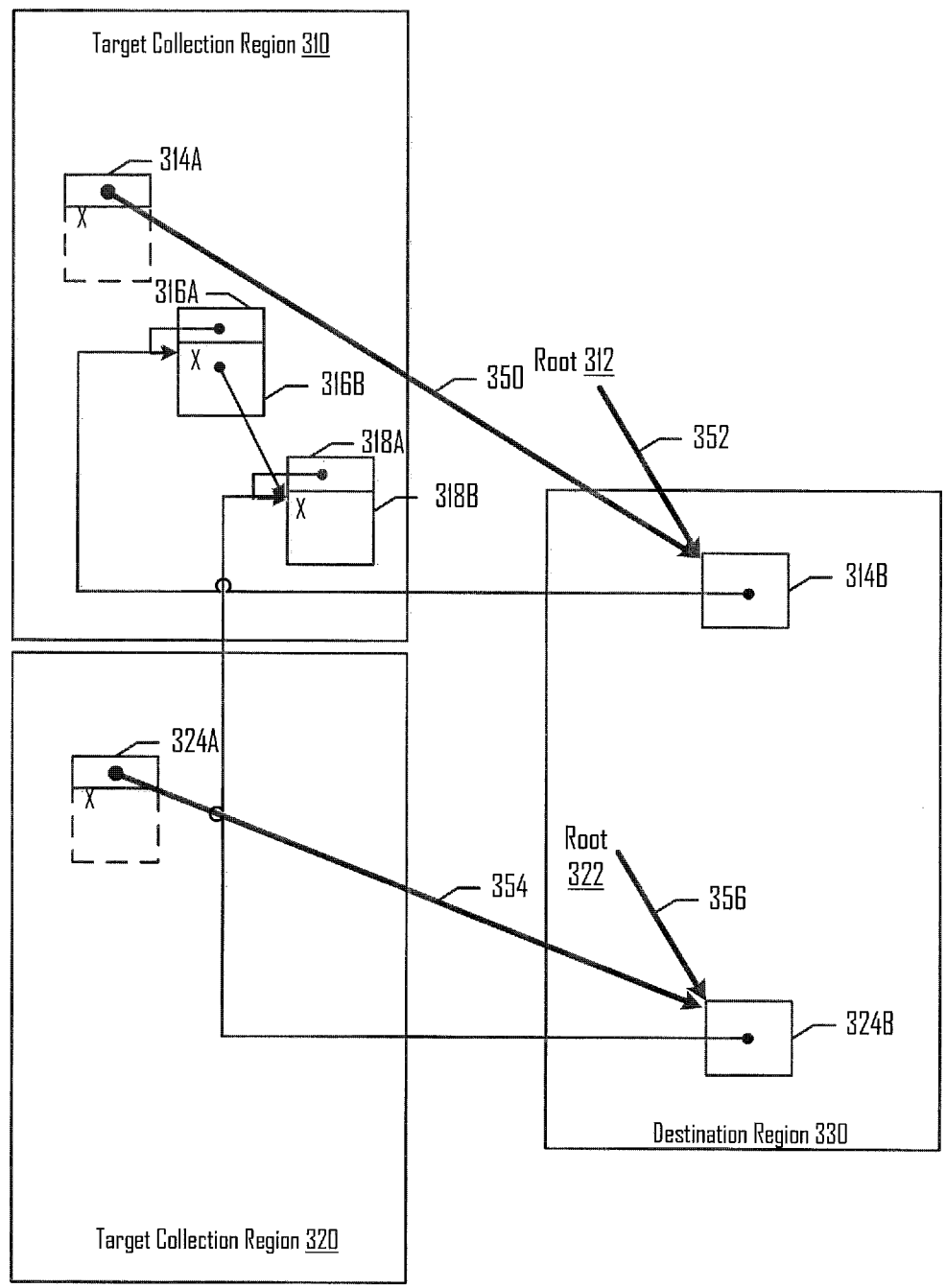

In FIG. 3A, root 312 references shared object 314B stored in target collection region 310, and root 322 references shared object 324B stored in target collection region 320. FIG. 3B is a diagram illustrating regions 310 and 320 being depicted as target collection regions and region 330 being depicted as a destination region of the heap, according to an embodiment. In FIG. 3B, the garbage collector thread evacuates from target collection region 310 to destination region 330 of the heap shared object 314B by storing a copy of shared object 314B in destination region 330 and updating reference object 314A to store the current memory address of the copy of shared object 314B located in destination region 330, as indicated by bolded reference 350. The copy of shared object 314B continues to reference the one or more objects that shared object 314B stored in target collection region referenced. In particular, shared object 314B stored in destination region 330 continues to store a reference to shared object 316B located in target collection region 310. The garbage collector thread also updates the reference in root 312 to reference evacuated object 314B stored in destination region 330, as indicated by bolded reference 352.

Similarly, the garbage collector thread evacuates from target collection region 320 to destination region 330 of the heap shared object 324B by storing a copy of shared object 324B in destination region 330 and updating reference object 324A to store the current memory address of the copy of shared object 324B located in destination region 330, as indicated by bolded reference 354. The copy of shared object 324B continues to reference the one or more objects that shared object 324B stored in target collection region referenced. In particular, shared object 324B stored in destination region 330 continues to store a reference to shared object 318B located in target collection region 310. The garbage collector thread also updates the reference in root 322 to reference evacuated object 324B stored in destination region 330, as indicated by bolded reference 356.

The evacuation of shared object 314B may be performed before, during, or after the evacuation of shared object 324B. The dashed lines that are shown in target collection regions 310 and 320 illustrate the old copies of the shared objects.

3. Subsequent Concurrent Marking Phase

After the references in the appropriate roots have been updated to reference the destination region of the heap, the garbage collector may resume the execution of application 106 on computing device 104. In an example, during a time period in which the garbage collector and mutator threads are running concurrently, garbage collector 110 performs a subsequent concurrent marking phase and maintains a calculation of the live data. During the subsequent concurrent marking phase, a garbage collector thread may mark as live data one or more reachable objects stored on the heap using the techniques discussed above. The object graph may be constantly changing such that the shared objects marked as live data during the initial concurrent marking phase may be different from the shared objects marked as live data during the subsequent concurrent marking phase. In an example, a shared object that was marked as live during the concurrent marking phase and evacuated from a target collection region to a destination region of the heap may no longer be alive during the subsequent concurrent marking phase. Accordingly, during the subsequent concurrent marking phase, this shared object will not be marked.

Figure 3C:
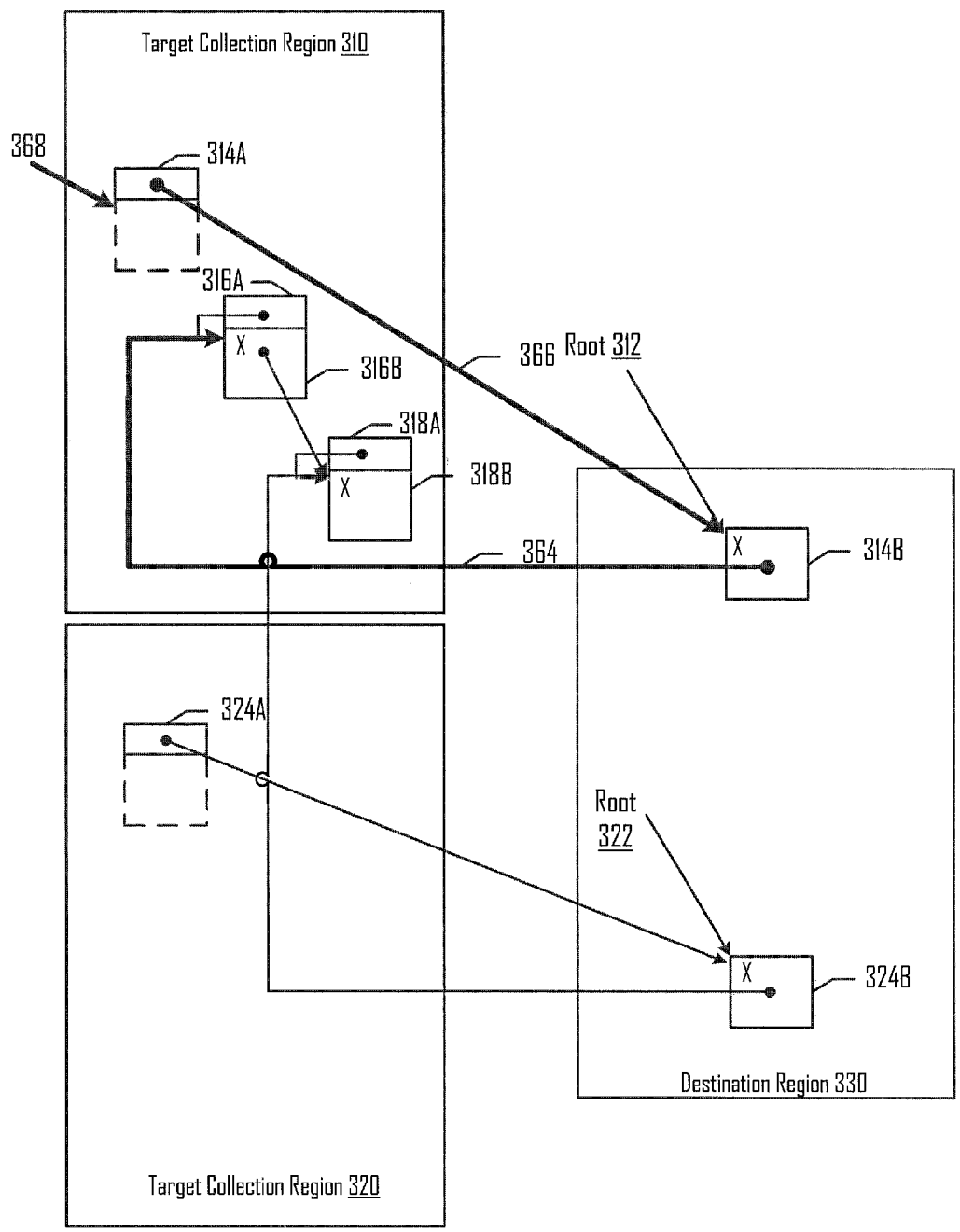

FIG. 3C is a diagram illustrating shared objects marked during the subsequent current marking phase, according to an embodiment. In FIG. 3C, the garbage collector threads mark shared objects 316B and 318B stored in target collection region 310 and shared objects 314B and 324B stored in destination region 330.

4. Evacuate Traversed Objects Located in Target Collection Regions and Update References After the subsequent concurrent marking phase, the garbage collector may traverse the objects marked during the subsequent concurrent marking phase. In an example, the garbage collector thread may traverse the marked objects by identifying an object graph including marked objects directly and indirectly referenced by a root. In another example, the garbage collector thread traverses the marked objects by traversing sequential memory addresses of the heap. During a time period in which the garbage collector and mutator threads are running concurrently, garbage collector 110 may traverse the objects marked in the subsequent concurrent marking phase and update appropriate references that reference a memory address in the target collection region with a reference to the corresponding memory address in the destination region.

Figure 3D:
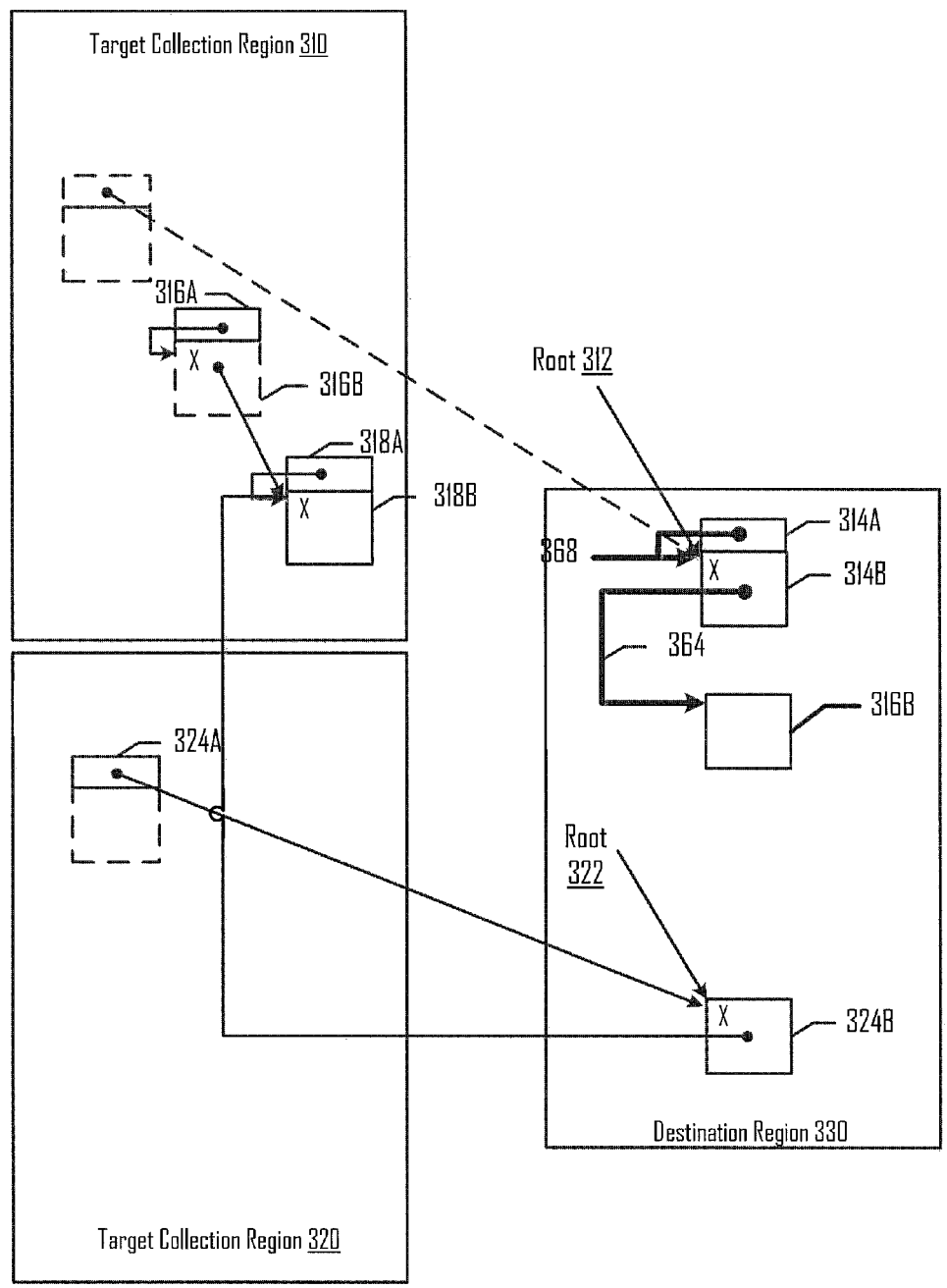

Referring back to FIG. 3C, from root set 312, the garbage collector thread may traverse shared object 314B and determine that it is not located in a target collection region of the heap. For each traversed object of the set of traversed objects, the garbage collector threads may update one or more references associated with the traversed object. FIG. 3D is a diagram illustrating references associated with shared object 314B being updated to reference the most up-to-date version of shared object 314B in destination region of the heap, according to an embodiment.

The garbage collector thread may update any references stored in a first shared object that point to a memory address of a second shared object in the target collection region to reference a memory address of the second shared object in the destination region of the heap. For example, the garbage collector thread may identify one or more references stored in shared object 314B. In an example, the garbage collector thread determines whether traversed object 314B stores a reference to another shared object. In FIG. 3B, traversed object 314B stores a reference to shared object 316B, as indicated by bolded reference 364 in FIG. 3C. The garbage collector thread may perform the actions discussed above to evacuate shared object 316B stored in the target collection region to a destination region of the heap. The garbage collector thread may determine whether the reference stored in shared object 314B to shared object 316B references a memory address in a target collection region. When the reference stored in shared object 314B to shared object 316B is determined to reference a memory address in a target collection region, the garbage collector thread updates the reference stored in shared object 314B with a reference to shared object 316B located in the destination region of the heap. Accordingly, memory space previously occupied by shared object 316B in the target collection region may be reclaimed as free space.

The garbage collector thread may also identify one or more references that reference shared object 314B. In an example, the garbage collector thread identifies reference object 314A storing a current memory address of shared object 314B, indicated by bolded reference 366 in FIG. 3C. The garbage collector thread may determine whether reference object 314A is stored in a target collection region of the heap. When reference object 314A is determined to be stored in the target collection region, the garbage collector thread may store a copy of reference object 314A in destination region 330 of the heap, and the copy of reference object 314A in the destination region stores a reference to shared object 314B. Accordingly, memory space previously occupied by reference object 314A in the target collection region may be reclaimed as free space. Accordingly, references to the old version of shared object 314B are updated to reference the most up-to-date version of shared object 314B stored in the destination region of the heap.

The garbage collector thread may also identify one or more references that reference shared object 314B located in the target collection region of the heap, as indicated by bolded reference 368. In an example, the garbage collector thread identifies an initial memory address of shared object 314B located in target collection region 310 of the heap and identifies a set of references that reference the initial memory address of traversed shared object 314B. Reference 368 references the initial memory address of shared object 316B. The set of references may include, for example, references from a mutator thread's call stack. The garbage collector thread may update the set of identified references to reference the copy of traversed shared object 314B stored in destination region 330 of the heap. Accordingly, memory space previously occupied by reference object 314A in the target collection region may be reclaimed as free space.

Figure 3E:
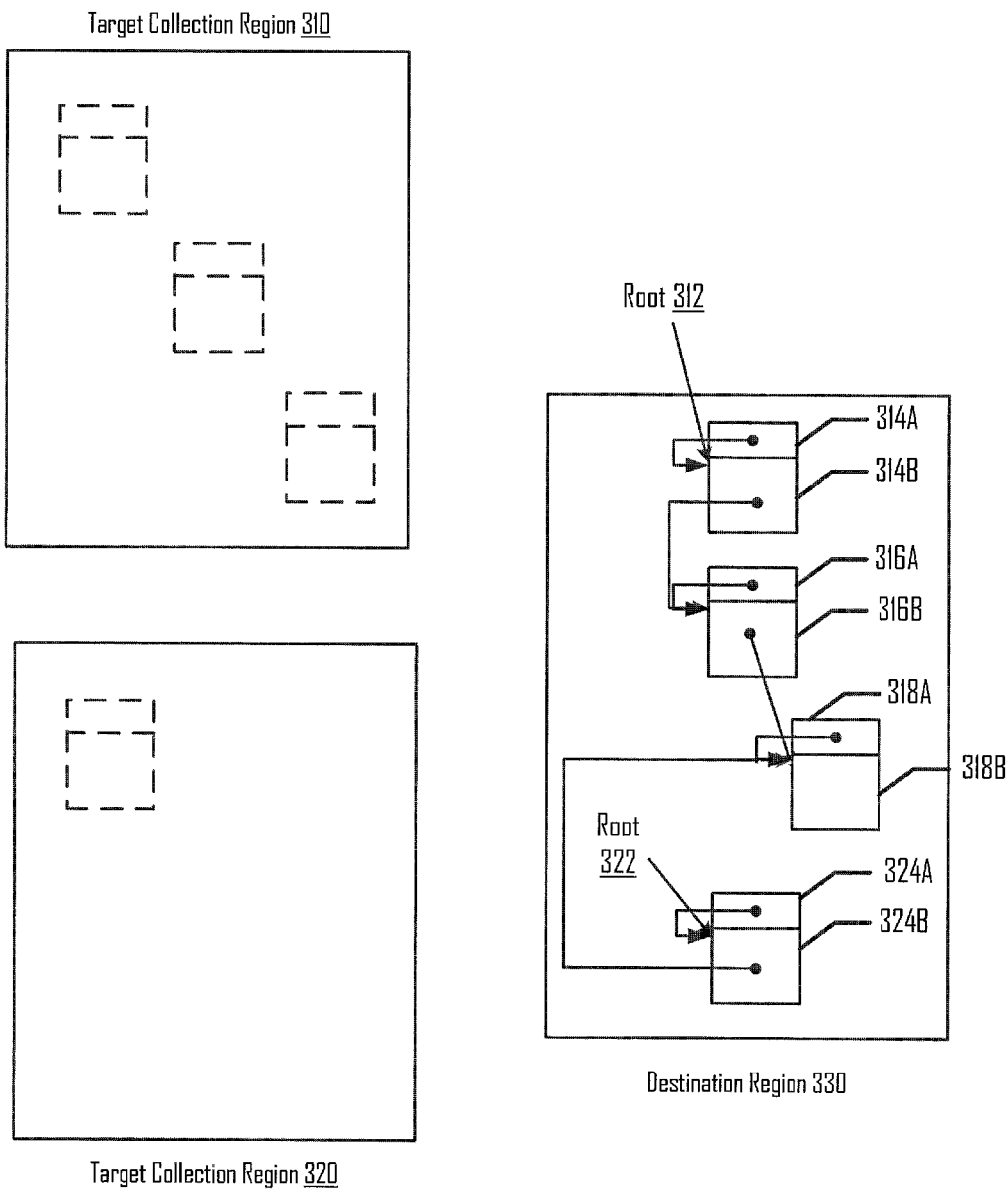

The garbage collector threads continue to traverse the marked objects until all of the references have been updated. FIG. 3E is a diagram illustrating target collection regions 310 and 320 and destination region 330 after the garbage collector threads have evacuated from a target collection region to the destination region of the heap the objects marked during the subsequent concurrent marking phase and updated the references associated with the traversed objects, according to an embodiment.

After the marked objects stored in the target collection regions have been evacuated to a destination region and the references associated with the traversed objects updated, it is safe to reallocate the memory spaces occupied by objects that are not reachable. Objects that are not reachable can no longer affect the program. The target collection regions may be reclaimed after the references associated with the traversed objects are updated.

Figure 3F:
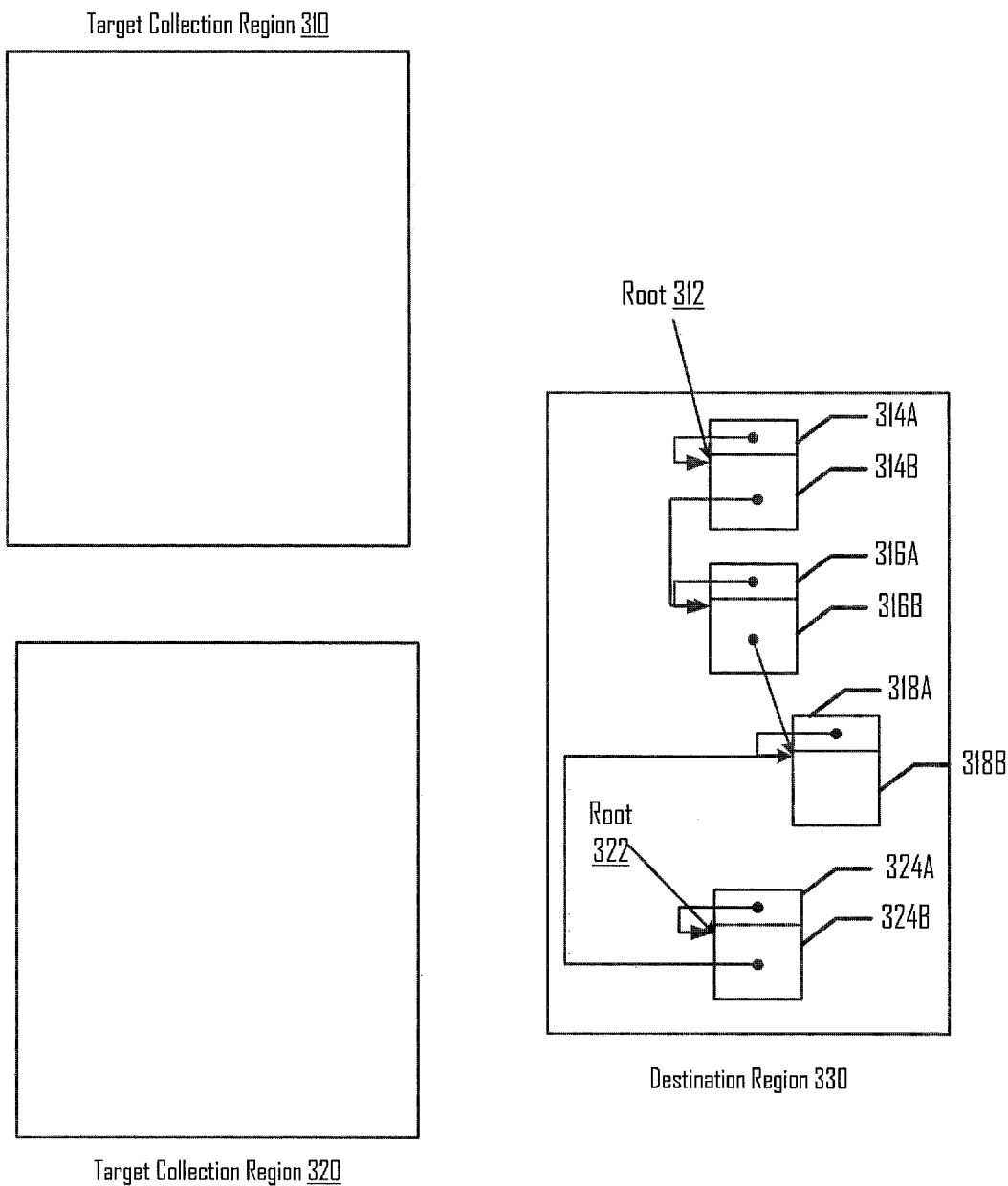

FIG. 3F is a diagram illustrating memory space being reclaimed from target collection regions 310 and 320 as free space and objects that were stored in target collection regions 310 and 320 compacted into destination region 330, according to an embodiment. In an example, during a period of time in which application 106 is paused on computing device 104, the garbage collector reclaims the identified set of target collection regions as free space in the heap.

The garbage collector may continuously perform the subsequent garbage collection cycles. For example and as discussed, for each region of the plurality, the garbage collector maintains a calculation of live data in the respective region. The garbage collector may select a target collection region and go through the subsequent garbage collector cycle. The garbage collector may also determine to perform the initial garbage collection cycle and then go through the subsequent garbage collection cycles to free space.

As discussed above and further emphasized here, FIGS. 1, 2, and 3A-3F are merely examples, which should not unduly limit the scope of the claims. For example, it should be understood that a managed runtime may execute more than one application on a computing device. Additionally, although the memory address of reference object 202 has been described as preceding and being adjacent to the memory address of shared object 204, this is not intended to be limiting. Rather, reference object 202 may be stored at a location relative to shared object 204 such that a thread may determine the location of reference object 202.

Further, computing device 104 may include a memory manager that includes garbage collector 110. Garbage collector may include a region identifier, a marking module, and an evacuator. In an embodiment, the region identifier identifies a plurality of regions of a heap storing one or more objects of a first type and one or more objects of a second type and selects a set of target collection regions of the heap. During a concurrent marking phase, for each region of the plurality the region identifier maintains a calculation of live data in the respective region. Space from the heap is allocated for an application. Each object of the second type stores a memory address of an object of the first type. The plurality of regions includes one or more target collection regions and one or more destination regions. In an embodiment, the marking module in a concurrent marking phase marks one or more reachable objects of the first type as live data. The one or more reachable objects marked in the concurrent marking phase is stored on the heap. In an embodiment, the evacuator traverses the objects of the first type marked in the concurrent marking phase and evacuates a set of traversed objects from one or more target collection regions of the set of target collection regions to a destination region of the heap.

Moreover, computing device 104 may be coupled to a network (not shown). The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

IV. Example Method

Figure 4:
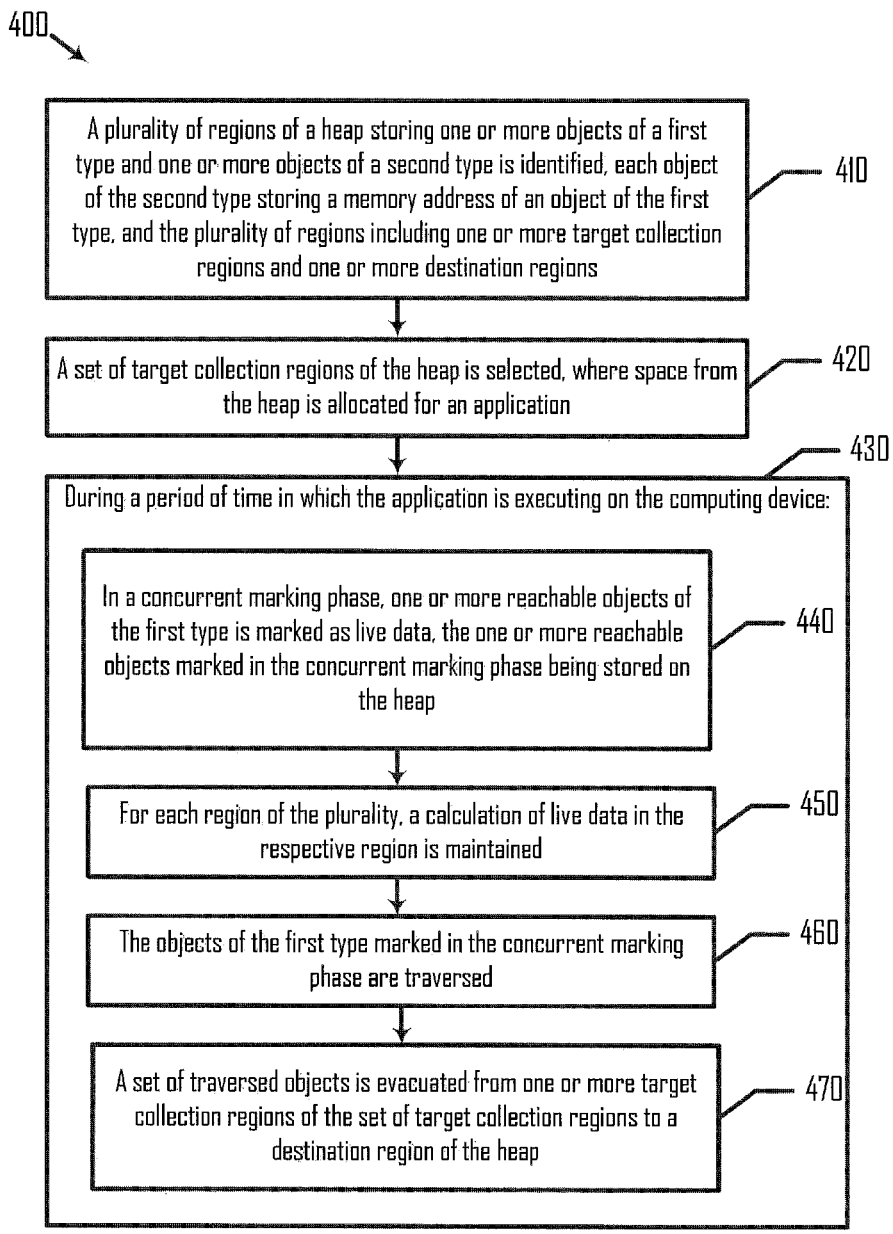
FIG. 4 is a flowchart illustrating a method of managing memory, according to an embodiment.

FIG. 4 is a flowchart illustrating a method 400 of managing memory, according to an embodiment. Method 400 is not meant to be limiting and may be used in other applications.

In FIG. 4, method 400 includes actions 410-470. In an action 410, a plurality of regions of a heap storing one or more objects of a first type and one or more objects of a second type is identified, each object of the second type storing a memory address of an object of the first type, and the plurality of regions including one or more target collection regions and one or more destination regions. In an example, a garbage collector thread identifies a plurality of regions of a heap storing one or more objects of a first type and one or more objects of a second type, each object of the second type storing a memory address of an object of the first type, and the plurality of regions including one or more target collection regions and one or more destination regions.

In an action 420, a set of target collection regions of the heap is selected, where space from the heap is allocated for an application. In an example, a garbage collector thread selects a set of target collection regions 310 and 320 of the heap, where space from the heap is allocated for application 106. In an action 430, during a period of time in which the application is executing on a computing device, actions 440-470 are performed. In an example, during a period of time in which application 106 is executing on computing device 104, actions 4470-470 are performed.

In an action 440, in a concurrent marking phase, one or more reachable objects of the first type is marked as live data, the one or more reachable objects marked in the concurrent marking phase being stored on the heap. In an example, in a concurrent marking phase, a garbage collector thread marks one or more reachable objects of the first type as live data, the one or more reachable objects marked in the concurrent marking phase being stored on the heap. In an action 450, for each region of the plurality, a calculation of live data in the respective region is maintained. In an example, for each region of the plurality, a garbage collector thread maintains a calculation of live data in the respective region. In an action 460, the objects of the first type marked in the concurrent marking phase are traversed. In an example, a garbage collector thread traverses the objects of the first type marked in the concurrent marking phase. In an action 470, a set of traversed objects is evacuated from one or more target collection regions of the set of target collection regions to a destination region of the heap. In an example, a garbage collector thread evacuates a set of traversed objects from one or more target collection regions of the set of target collection regions to a destination region of the heap.

It is also understood that additional method actions may be performed before, during, or after actions 410-470 discussed above. It is also understood that one or more of the actions of method 400 described herein may be omitted, combined, or performed in a different sequence as desired.

V. Example Computing System

Figure 5:
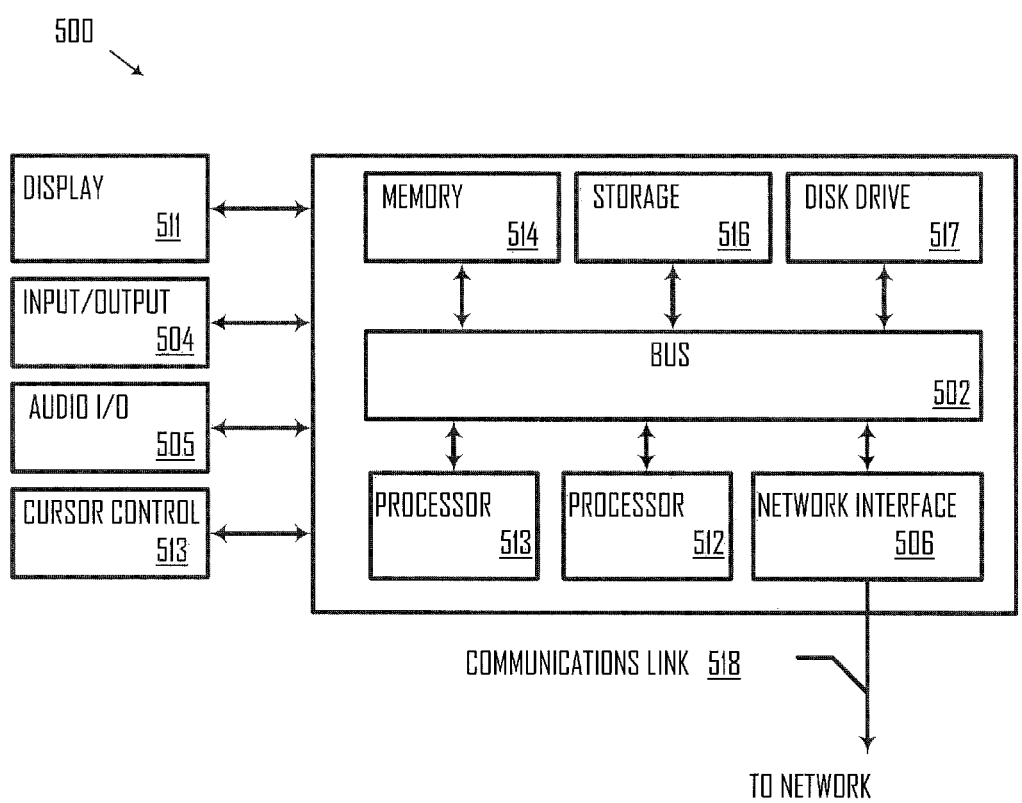
FIG. 5 is a block diagram of a computer system suitable for implementing one or more embodiments of the present disclosure

FIG. 5 is a block diagram of a computer system 500 suitable for implementing one or more embodiments of the present disclosure. In various implementations, computing device 104 may include a client or a server computing device. The client or server computing device may include multiple processors 512 and 513. Computer system 500 may include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or a server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component such as a display 511, and an input control such as a cursor control 513 (such as a keyboard, keypad, mouse, etc.). A transceiver or network interface 506 transmits and receives signals between computer system 500 and other devices via a communication link 518 to a network. In an embodiment, the transmission is wireless, although other transmission mediums and methods may also be suitable. Processors 512 and 513, which may each be a micro-controller, digital signal processor (DSP), or other processing component, processes these various signals, such as for display on computer system 500 or transmission to other devices via communication link 518. Processors 512 and 513 may also control transmission of information, such as cookies or IP addresses, to other devices. The operating system may partition memory 514 into several sections, one being the "heap." Processors 512 and 513 may share a portion of the heap. Each processor may have local RAM, cache, and mass storage as well as communications and I/O devices.

Components of computer system 500 also include a system memory component 514 (e.g., RAM), a static storage component 516 (e.g., ROM), and/or a disk drive 517. The heap may be allocated from system memory component 514, and the shared objects and the reference objects may be stored on the heap.

Computer system 500 performs specific operations by processor 512, 513 and other components by executing one or more sequences of instructions contained in system memory component 514. Logic may be encoded in a computer readable medium, which may refer to any medium that participates in providing instructions to processor 512, 513 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 514, and transmission media includes coaxial cables, copper wire, and fiber optics, including wires that include bus 502. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, memory cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PSTN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various actions described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for managing memory for an application, the system comprising:
   a region identifier that identifies a plurality of regions of a heap storing one or more objects of a first type and one or more objects of a second type and selects a set of target collection regions of the heap, wherein space from the heap is allocated for an application, each object of the second type stores a memory address of an object of the first type, and the plurality of regions includes one or more target collection regions and one or more destination regions,
   wherein during a concurrent marking phase, for each region of the plurality the region identifier maintains a calculation of live data in the respective region;
   a marking module that in the concurrent marking phase marks one or more reachable objects of the first type as live data, wherein the one or more reachable objects marked in the concurrent marking phase is stored on the heap;
   an evacuator that traverses the objects of the first type marked in the concurrent marking phase and evacuates a set of traversed objects from one or more target collection regions of the set of target collection regions to a destination region of the heap; and
   a garbage collector thread that scans a root set, wherein for each root of the root set that references an object of the first type stored in a target collection region of the set of target collection regions, the garbage collector thread evacuates from the target collection region to a destination region of the heap the respective object that is referenced by the respective root and updates the respective root to reference the evacuated object stored in the destination region.

2. The system of claim 1, wherein the concurrent marking phase occurs during a first period of time in which the application is executing on a computing device.

3. The system of claim 2, wherein the garbage collector thread scans the root set during a second period of time in which the application is paused on the computing device, and wherein the second period of time precedes the first period of time.

4. The system of claim 1, wherein the evacuator identifies a marked object referenced by a root of the root set and recursively follows the references to objects.

5. A method of managing memory for an application, the method comprising:
identifying a plurality of regions of a heap storing one or more objects of a first type and one or more objects of a second type, each object of the second type storing a memory address of an object of the first type, and the plurality of regions including one or more target collection regions and one or more destination regions;
selecting a set of target collection regions of the heap, wherein space from the heap is allocated for an application;
during a first period of time in which the application is executing on a computing device:
in a concurrent marking phase, marking one or more reachable objects of the first type as live data, the one or more reachable objects marked in the concurrent marking phase being stored on the heap;
for each region of the plurality, maintaining a calculation of live data in the respective region;
traversing the objects of the first type marked in the concurrent marking phase; and
evacuating a set of traversed objects from one or more target collection regions of the set of target collection regions to a destination region of the heap; and
during a second period of time in which the application is paused on the computing device:
scanning a root set; and
for each root of the root set that references an object of the first type stored in a target collection region of the set of target collection regions, evacuating from the target collection region to a destination region of the heap the respective object that is referenced by the respective root and updating the respective root to reference the evacuated object stored in the destination region.

6. The method of claim 5,
wherein the selecting a set of target collection regions includes during the second period of time, selecting the set of target collection regions, and
wherein the second period of time precedes the first period of time.

7. The method of claim 6, further comprising:
during a third period of time in which the application is paused on the computing device, marking the root set; and
during a fourth period of time in which the application is executing on the computing device:
in a second concurrent marking phase preceding the first concurrent marking phase, marking one or more reachable objects of the first type as live data, the one or more reachable objects marked in the second concurrent marking phase being stored on the heap; and
for each region of the plurality, maintaining a calculation of live data in the respective region; and
during a fifth period of time in which the application is paused on the computing device:
identifying updates that occurred during the fourth period of time to shared objects; and
marking one or more shared objects based on the identified updates, and wherein the third, fourth, and fifth periods of time precede the second period of time.

8. The method of claim 7, further comprising:
determining whether a traversed object of the first type is located in a target collection region of the heap,
wherein the evacuating a set of traversed objects includes when the traversed object is determined to be located in the target collection region of the heap, evacuating the traversed object of the first type.

9. The method of claim 8, wherein the evacuating the traversed object comprises:
storing a copy of the traversed object in a destination memory address located in the destination region of the heap;
identifying an object of the second type storing a current memory address of the traversed object of the first type; and
updating the current memory address stored in the object of the second type with the destination memory address.

10. The method of claim 9, wherein the identifying an object of the second type comprises:
computing, based on a last-known memory address of the traversed object of the first type, a memory address of the object of the second type.

11. The method of claim 9, wherein the evacuating a traversed object comprises:
identifying an initial memory address of the traversed object located in the target collection region of the heap; and
determining whether the initial memory address matches the current memory address of the traversed object,
wherein the updating includes when the initial memory address is determined to match the current memory address of the evacuated object, updating the current memory address stored in the object of the second type with the destination memory address.

12. The method of claim 9, further comprising:
for each traversed object of the set of traversed objects, updating one or more references associated with the traversed object.

13. The method of claim 12, further comprising:
determining whether the traversed object of the first type stores a reference to a second object of the first type; and
when the traversed object is determined to store the reference to the second object, determining whether the reference references a memory address in a target collection region,
wherein the updating one or more references associated with the traversed object includes when the reference is determined to reference a memory address in a target collection region, updating the reference stored in the traversed object with a reference to a memory address of a copy of the second object stored in the destination region of the heap.

14. The method of claim 12, further comprising:
identifying an object of the second type storing a current memory address of the traversed object of the first type; and
determining whether the identified object of the second type is stored in a target collection region,
wherein the updating one or more references associated with the traversed object includes when the identified object of the second type is determined to be stored in the target collection region, storing a copy of the identified object of the second type in the destination region of the heap, wherein the copy of the identified object of the second type stores a reference to the traversed object.

15. The method of claim 12, further comprising:
identifying an initial memory address of the traversed object located in the target collection region of the heap; and
identifying a set of references that reference the initial memory address of the traversed object,
wherein the updating one or more references associated with the traversed object includes updating the set of identified references to reference to a memory address of the copy of the traversed object stored in the destination region of the heap.

16. The method of claim 12, further comprising:
during a sixth period of time in which the application is paused on the computing device, reclaiming the identified set of target collection regions as free space in the heap,
wherein the reclaiming occurs after the updating one or more references associated with the traversed object.

17. The method of claim 5, wherein the traversing the marked objects of the first type includes identifying a marked object referenced by a root of the root set and recursively following the references to objects.

18. The method of claim 17, wherein the identifying a marked object referenced by a root of the root set and recursively following the references to objects includes identifying an object graph.

19. The method of claim 5, wherein the traversing the marked objects of the first type includes traversing sequential memory addresses of the heap.

20. A non-transitory machine-readable medium comprising a plurality of machine-readable instructions that when executed by one or more processors is adapted to cause the one or more processors to perform a method comprising:
identifying a plurality of regions of a heap storing one or more objects of a first type and one or more objects of a second type, each object of the second type storing a memory address of an object of the first type, and the plurality of regions including one or more target collection regions and one or more destination regions;
selecting a set of target collection regions of the heap, wherein space from the heap is allocated for an application;
during a first period of time in which the application is executing on a computing device:
in a concurrent marking phase, marking one or more reachable objects of the first type as live data, the one or more reachable objects marked in the concurrent marking phase being stored on the heap;
for each region of the plurality, maintaining a calculation of live data in the respective region;
traversing the objects of the first type marked in the concurrent marking phase; and
evacuating a set of traversed objects from one or more target collection regions of the set of target collection regions to a destination region of the heap; and
during a second period of time in which the application is paused on the computing device:
scanning a root set; and
for each root of the root set that references an object of the first type stored in a target collection region of the set of target collection regions, evacuating from the target collection region to a destination region of the heap the respective object that is referenced by the respective root and updating the respective root to reference the evacuated object stored in the destination region.

\* \* \* \* \*